June 22, 1943. V. S. ROACH ET AL 2,322,732
ELECTRIC SWITCH AND CONTROL THEREFOR
Filed July 14, 1941 2 Sheets-Sheet 1
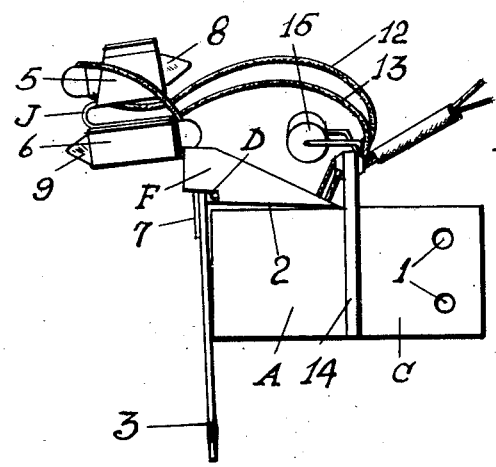
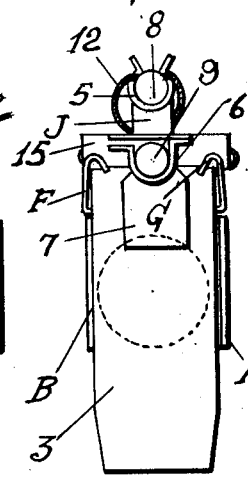
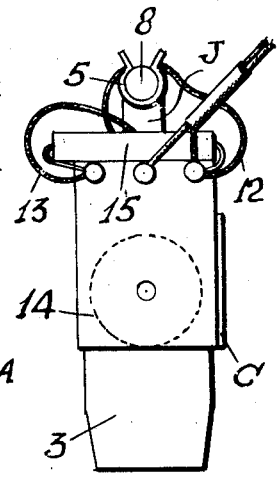
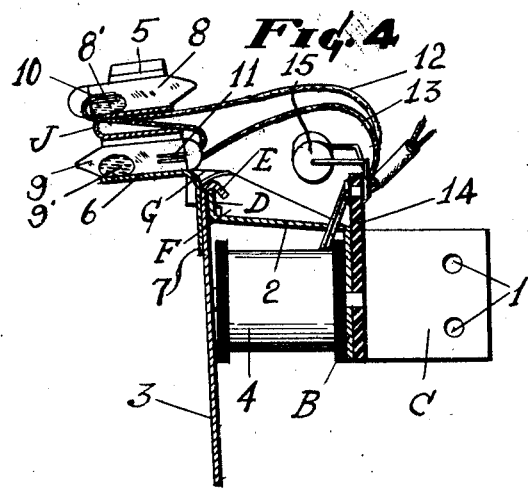
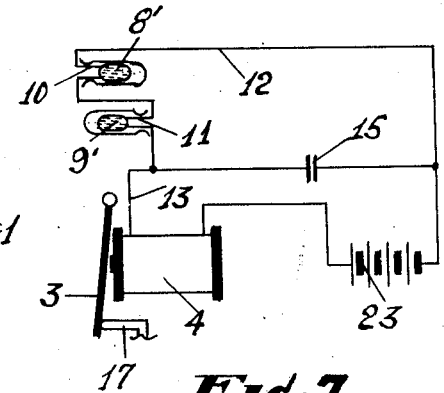
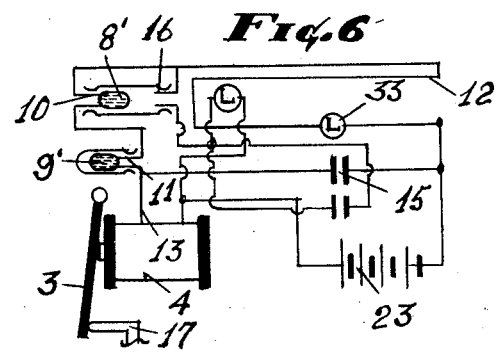
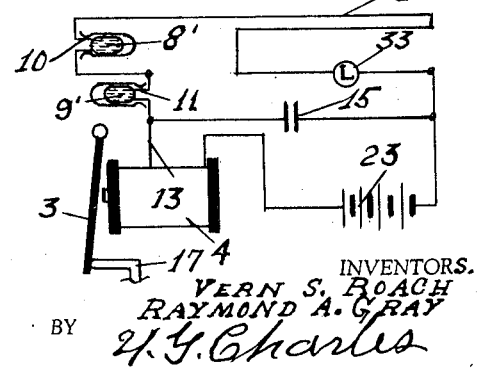
INVENTORS.
VERN S. ROACH
RAYMOND A. GRAY
BY H. Y. Charles
ATTORNEY.

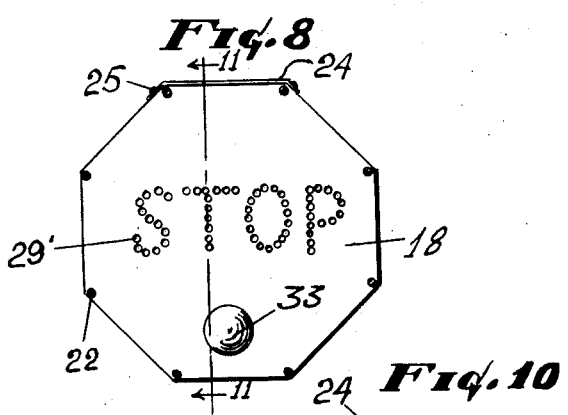
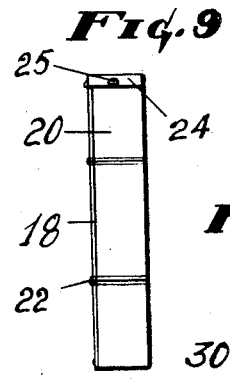
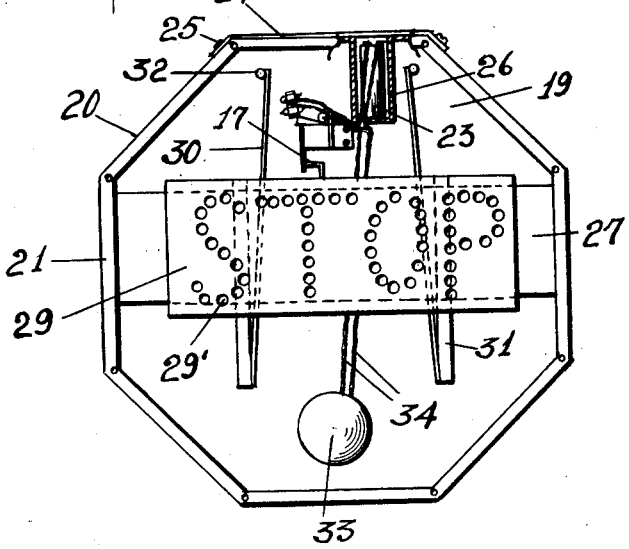
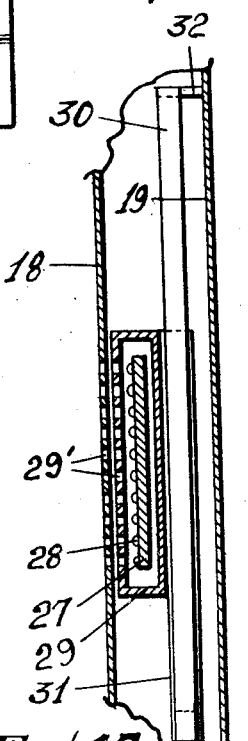
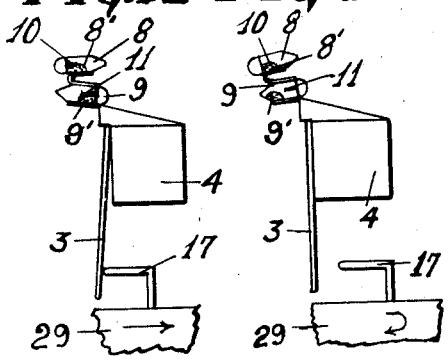
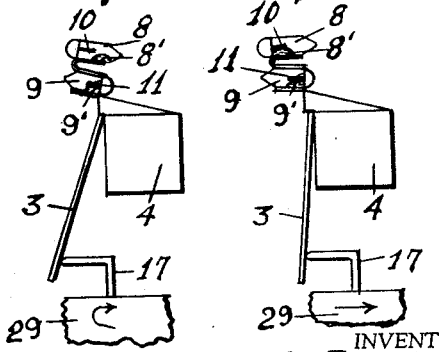

Patented June 22, 1943

2,322,732

UNITED STATES PATENT OFFICE 2,322,732

ELECTRIC SWITCH AND CONTROL THEREFOR

Vern S. Roach, Wichita, and Raymond A. Gray, Rock, Kans., assignors to H. H. Hurst, Wichita, Kans.

Application July 14, 1941, Serial No. 402,332

2 Claims. (Cl. 172—126)

Our invention relates to new and useful improvements in an electric switch and control therefor as an electric current saving device, and has for its principal object to minimize the time duration of a closed switch as well as a prolongation of the open time of the switch, whereby the reciprocal swing of a pendantly supporting structure is actuated by a sudden mechanical thrust at the instant of closing the current and by a slight further swing in the same direction is means to instantly break the current that remains disengaged, awaiting the rebound of the swinging structure for a repeated thrust, the time duration of the current idleness being very much greater than its engaged period therefor, whether this principle be to exercise a swinging sign or to illuminate for safety signal purpose, efficiency is had with a decided conservation of electric current, whether such current be from batteries or an electric power plant.

A further object of this invention is to construct an electric power plant consisting of a battery, condenser, electro magnet, mercury switches, and an oscillatory element to carry and rock the switches to control the flow of the mercury to make and break the electric current intermittently, whereby railroad and other traffic signals are efficiently operated, and furthermore to oscillate reflective signs along the highway, the reflection being created by the light rays of headlights of motor-driven vehicles approaching the signs; the movement of the sign intermittently is a means of attraction to the traffic control as worded.

A still further object of this invention is to provide a switch consisting of a pair of transparent tubes arranged to coact to make and break an electric current, each tube being charged with mercury in such quantity as to flow freely from end to end of their respective tubes, and the said tubes each having electrodes entering at the ends thereof oppositely with respect to each other to energize an electric magnet, and one of said tubes may have electrodes in each end thereof, one of which will coact with the signal electrode in the other tube to energize the said magnet while the second electrodes in one of the tubes constitute a circuit within themselves to energize an electric lamp, and another lamp being in series with the magnet; the said switch being so arranged is means to operate a continuous oscillatory movement of a pendulum or the like, and also to produce the illumination of lamps alternately independent of the pendulum action or in conjunction therewith as the case may require.

These and other objects will hereinafter be more fully explained, reference being had to the accompanying drawings forming a part of this specification, and in which like characters will apply to like parts in the different views.

Referring to the drawings:

Fig. 1 is a front view of the switch mechanism.

Fig. 2 is a left side view of Fig. 1.

Fig. 3 is a right side view of Fig. 1.

Fig. 4 is a vertical sectional view through the supporting frame of the switch mechanism.

Fig. 5 is a wiring diagram showing the relation of the switch to the magnet.

Fig. 6 is a wiring diagram showing the switch modified for a pair of lamps and also the switch relation to the magnet.

Fig. 7 is a wiring diagram connecting the switch mechanism, magnet and a single lamp.

Fig. 8 is a front view of a traffic signal.

Fig. 9 is a side view of Fig. 8.

Fig. 10 is an enlarged front view of the signal having its front plate removed for convenience of illustrating the position of the switch mechanism.

Fig. 11 is an enlarged sectional view taken on line 11—11 in Fig. 8, parts removed for convenience of illustration.

Figs. 12 to 15 inclusive illustrate one complete cycle of the switch action to repeatedly swing a pendant supported element by magnetic force as follows: Fig. 12 illustrates the switch at the instant of closing the circuit to exercise the magnet to kick the pendant element in the direction of the arrow; Fig. 13 illustrates the maximum swing of a pendant structure as kicked in one direction, the switch being opened; Fig. 14 illustrates the maximum swing of the pendant in the opposite direction and adapted to close the circuit on its return as shown in Fig. 15.

The invention herein disclosed consists of a Z-shaped frame comprising portions A, B, and C, portion C being apertured as at 1 for screws to secure the frame to a support. Portion B has an extension 2 extending toward the left side and an upward extension D, the upper end of which is to function as a bearing for a return bend E of a flap 3, by which means the flap is pendantly carried and adapted to swing toward and from one end of an electric magnet 4, the other end of the magnet being secured to portion B of the frame.

To avoid displacement of the return bend E from its bearing D there is positioned at right angles from each edge of portion 2 a lip F extending upward, the upper points of which have a return bend G to engage on the flap as retaining means against an upward movement of the flap and lateral rocking movement thereof.

Carried by the flap and rockable therewith is a pair of receptors 5 and 6, and integrally joined by a U-bend J for vertical alignment of the tubes as shown in Fig. 4, and being secured to the flap by a lip 7 extending downward, lapping on the side thereof.

Secured in the receptors are transparent tubes 8 and 9 respectively, hereinafter referred to as upper and lower tubes, said tubes being liquid tight, and having mercury 8' and 9' positioned therein in such quantity as to flow from end to end of the tubes as rocked by the flap. It will be seen that the tubes have electrodes 10 and 11, respectively, oppositely disposed and extending inward at their respective ends of the tubes, whereby the mercury of each tube will flow in contact with its respective electrodes to close the circuit for the magnet when rocked to a certain position later described, said electrodes each having attached thereto its respective current wires 12 and 13 that extend toward the right side, and being secured to an insulation plate 14 that is carried by portion B of the frame, and from thence connecting with an electric current supply, one method of which is illustrated in Fig. 10 (later described).

Positioned in the current line between the supply or a battery is a condenser 15 to avoid a flash at the instant of contact of the mercury and the electrodes to prevent deterioration of the electrodes.

The said mercury switch tubes being carried as heretofore described is means to rock the longitudinal axis of the tubes from alignment with a horizontal plane, whereby the mercury will flow from end to end of their respective tubes when rocked to make and break a circuit along the moving path of the mercury to energize the magnet, or a lamp in series therewith.

In the event of two lamps alternately illuminated, a circuit is provided in one end of tube 8, by electrodes 16 that are oppositely disposed to the electrodes in the other end of the tube which is one side of its respective circuit, the other side being embodied in tube 9, this being the circuit for the magnet, and to energize the magnet, the mercury in each tube must momentarily be in contact with their respective electrodes. The magnet when energized will instantly attract the flap 3, forcing it in contact with its respective end of the magnet, while the lower extremity of the flap will engage a detent element 17 that is secured to a pendulum or pendantly supported element as oscillating means therefor, in which instance the detent, being carried by the pendulum, will move from engagement with the flap as shown in Fig. 13, and on its return will carry the flap well outward from the magnet as shown in Fig. 14, said Figs. 13 and 14 illustrating the maximum movement of either way for the pendulum, at which extremity of movement it will be seen that the circuit is broken, but is closed as the pendulum moves to the position shown in Figs. 12 and 15 for a repeated stroke by the flap, and so on throughout the cycle as illustrated in Figs. 12 to 15 inclusive. The closing instant of the circuit is well illustrated in Fig. 5 in which position of the flap the mercury in both tubes is in contact with their respective sides of the circuit to energize the magnet which is the starting means for the oscillation of the pendulum. Attention is also directed that the position of the flap and tubes as illustrated in Fig. 13 is accomplished by gravity action upon the component parts of the switch arrangement; being so positioned, the circuit is broken, and the time of idleness is accomplished by the distance that the mercury moves to its destiny for closing the circuit; in other words, the experimental test with this invention has developed that the momentum of the pendulum on its path to move the flap outward was sufficient to overrule the magnetic attraction as it separated the flap from the end of the magnet, while on the other hand the return of the flap with the assistance of gravity was in harmony with the magnet therefor; sufficient power was energized to create a greater kick upon the pendulum that was sufficient to maintain a uniform oscillatory movement. It is true, however, that by a bend of the U to vary the distance from parallelism of the tubes is a means to shorten or prolong the contact of the electric current, whereby conservation of the current may be had as well as to vary the speed of the oscillatory movement. It will also be understood in view of the above that a broader scope of variation may be had by increasing the length of the tubes, or diminishing the quantity of mercury as the latter is gravitationally actuated.

As heretofore described with respect to Fig. 14, the circuit will not be closed as the flap is moved outward, but due to the non-parallelism of the tubes, the circuit is closed promptly when the flap and the tubes are positioned as shown in Fig. 12. In other words, the mercury in the lower tube is retained while the mercury in the upper tube will instantly plunge in contact with its respective electrodes due to the slope of said upper tube, ranging downward to the left across a horizontal plane closing the circuit for the magnet. When the flap is brought to snug engagement with the magnet, both of said tubes with their varying slants will be in the same direction as shown in Fig. 13.

It will now be seen the method of automatically closing the circuit, and furthermore, the instant of circuit closure is of short duration compared with the duration of disengagement whereby conservation of the battery or current flow from a power plant is minimized.

In Figs. 8 to 11 inclusive is represented a highway signal control comprising a polygonal casing consisting of a front and back wall 18 and 19, respectively, and a side wall 20 extending therearound, said side wall having a flange 21 turned inward and on which the front will seat, and being secured by screws 22 spaced therearound, while the back is welded to the edge of the wall. The side wall portion at its upper extremity has an opening therethrough as accessible means to exchange the battery 23, the opening being sealed by a plate 24 and removably secured by a screw 25 at each end thereof, said battery having an appropriate housing 26 that is carried by the casing.

Diametrically crossing the casing and being carried by the side walls is a plate 27 spaced inward from the front wall of the casing, said plate having a plurality of jewels 28 placed thereon and aligned to form the letters of the word "Stop," or other appropriate indicia.

Positioned on the plate is a sleeve 29 of sufficient size to move longitudinally without interrupting the jewels, the side of the sleeve adjacent the front wall and including the front wall each being apertured as at 29 corresponding with the jewels on the plate, the apertures in the front and jewels being in axial registry and stationary, and likewise the apertures in the sleeve, except when rocked from registry as later described. Being so assembled, is means to prevent accumulation of snow and ice on the jewels, which otherwise would retard visibility of the reflection, the sleeve in its rocking movement being the means to effect a flash of the jewels when rocked to and from registry therewith, the reflection for best effect being produced by the headlights of approaching vehicles on the highways when all of the apertures and jewels are in registry. As a result, the word "Stop" is intermittently flashed by the swinging movement of the sleeve that is pendantly carried by a pair of leaf springs 30 secured to the lower extremity of bars 31 that extend downward from the sleeve, and being rigidly attached to the back thereof, while the upper ends of the springs each is secured to the back by its respective pin 32. It will now be seen that the pendant supporting means above described will flex so that the sleeve will function as a pendulum, and being actuated by the flap of the power plant heretofore described, said flap adapted to engage with the detent element 17 upwardly extending and rigidly secured to the sleeve.

As a further visual attraction for the highway signal, there is provided a spaced distance upward from the lower extremity of its casing a lamp 33 with an appropriate socket and wires 34 to connect the socket in series with the magnet, whereby the lamp will flash at the time the magnet is energized. It will be understood that the walls of the casing, plate, and the sleeve are of sheet metal.

While there is shown and described a polygonal form for the casing, the same may be rectangular or otherwise formed at the option of the manufacturer, and the magnet heretofore described may be a solenoid, the core of the solenoid carried by the flap for the same mechanical result heretofore described, and such other modifications may be employed as lie within the scope of the appended claims.

Having fully described our invention what we claim as new and desire to secure by Letters Patent is:

1. In an electric switch structure for pendulum movement, an electric magnet and a flap, means to rockably carry the flap in working relation to the magnet, and another means secured to the flap to carry a pair of mercury switches extending outward from one side of the flap, the extension being oppositely disposed to the position of the magnet for gravity control to swing the flap to engagement with the magnet, and the said switch elements and magnet being on the same electric circuit, there being means on a pendulum to move the flap outward from the magnet sufficient to close the circuit in both mercury switch elements and the said switch elements and magnet when energized by an electric current will start an oscillatory movement of the pendulum which in its oscillatory movement will make and break the current by rocking movement of the mercury switch elements as the said means on the pendulum moves the flap to rock said mercury switch elements across a horizontal plane alternately in opposite directions to effect the flow of the mercury in each element to close the circuit momentary at each rocking movement.

2. In an electric switch structure in combination with a swinging element, said switch structure comprising an electric magnet, a frame to support the magnet in close working relation to said swinging element, a flap to kick the element, said flap positioned adjacent one end of the magnet and having one of its ends rockably connected to said frame, the other end of said flap adapted to rock with the element when contacted therewith, a pair of mercury switches coactingly arranged and carried by the first said end of the flap to make and break an electric circuit for the magnet as the element swings, said mercury switches slantingly positioned oppositely from a horizontal plane when the circuit is closed for the magnet attracting the flap theretoward to produce the kick, the circuit being opened when the switches are rocked each way from said position, the flap in its rock toward the magnet when the magnet is energized having greater effect on the swinging element than when rocked in the opposite direction of movement whereby the element continues to swing.

VERN S. ROACH.
RAYMOND A. GRAY.